Sept. 1, 1925.
Re. 16,151
M. C. HEATH
MECHANISM FOR HANDLING BOTTLES, ETC
Original Filed Feb. 28, 1920 2 Sheets-Sheet 1
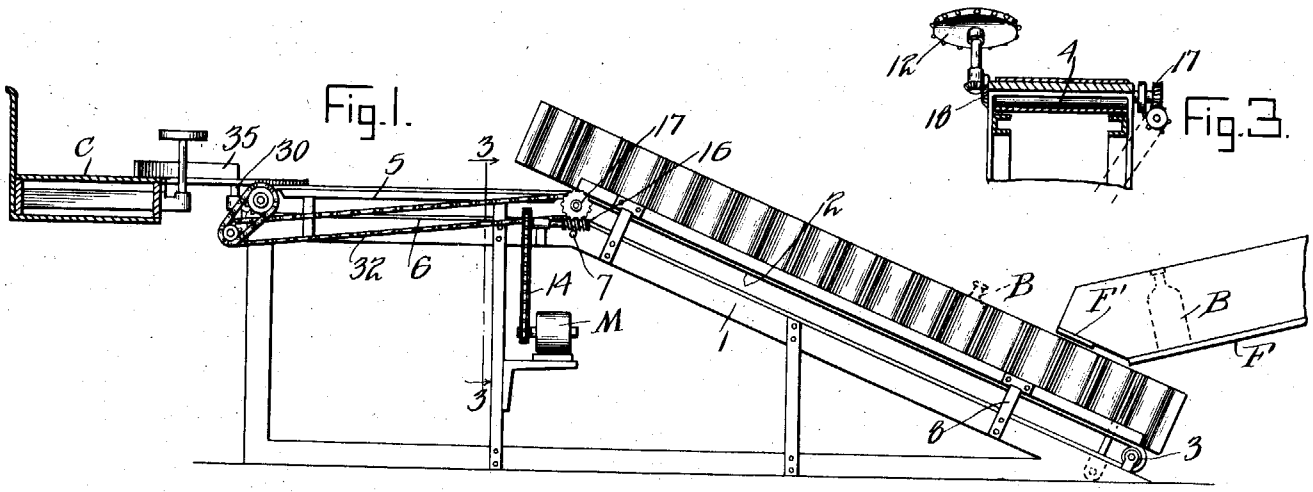
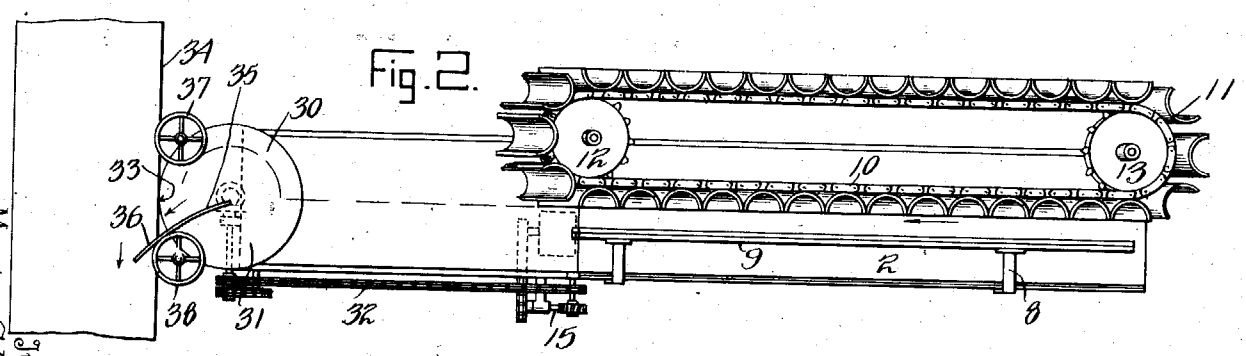
Inventor
Merton C. Heath
By
Attorney Sept. 1, 1925.
Re. 16,151
M. C. HEATH
MECHANISM FOR HANDLING BOTTLES, ETC
Original Filed Feb. 28, 1920 2 Sheets-Sheet 2
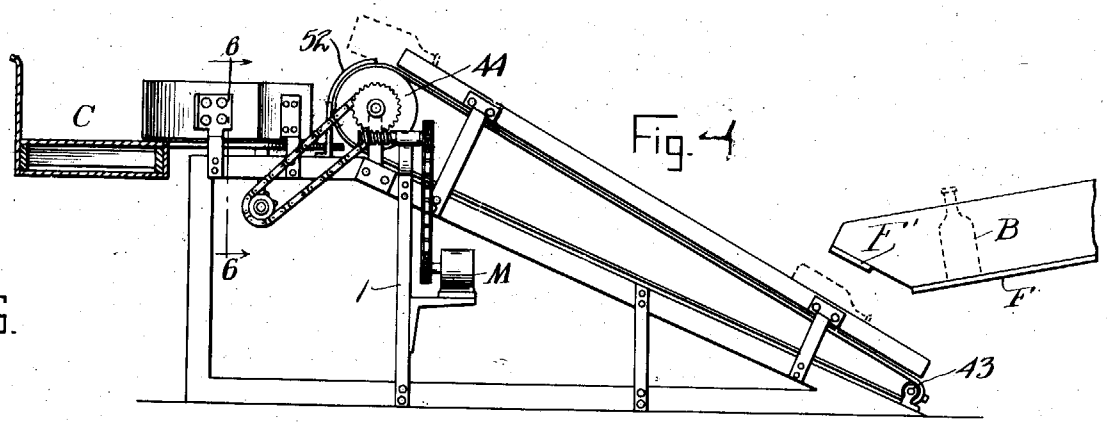
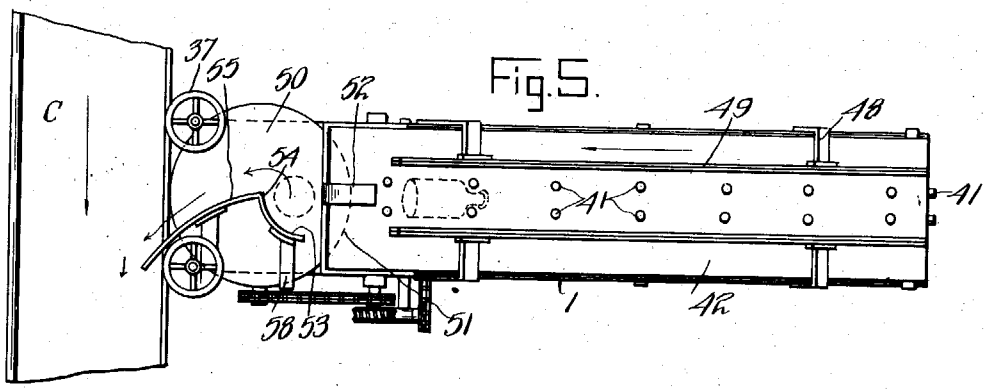
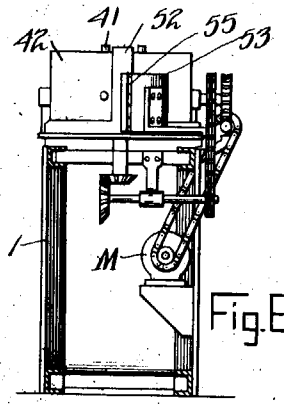
Inventor
Merton C. Heath.
By E. W. Bedford
Attorney Reissued Sept. 1, 1925.

Re. 16,151

UNITED STATES PATENT OFFICE.

MERTON C. HEATH, OF MUNCIE, INDIANA.

MECHANISM FOR HANDLING BOTTLES, ETC.

Original No. 1,460,020, dated June 26, 1923, Serial No. 361,971, filed February 28, 1920. Application for reissue filed September 24, 1923. Serial No. 664,592.

*To all whom it may concern:*

Be it known that I, MERTON C. HEATH, a citizen of the United States, residing at Muncie, in the county of Delaware and State of Indiana, have invented certain new and useful Improvements in Mechanism for Handling Bottles, Etc., of which the following is a specification.

This invention relates to conveyors, and more especially to such conveyors as are intended for handling glass bottles and similar fragile or brittle articles or objects; the principal object of the invention is to provide a conveyor for hot bottles which shall be free from the objectionable features found in conveyors hitherto in use for this purpose.

Another object is to produce mechanism whereby articles such as bottles may be taken from a certain point as the outlet from a bottle-forming machine, carried or elevated thence to another point along a certain line, stood on end, and transferred thence to a receiver or more particularly to a conveyor moving in a direction substantially at right angles to said line, as a factory conveyor or an asbestos belt to carry partly finished bottles to a furnace or the like.

Another object is to provide means for insuring proper spacing of the bottles while hot.

Still another object is to provide means to insure an upright position of each bottle on the final conveyor.

Another object is to provide an efficient transferring mechanism including a guard to prevent the up-ended bottles from tipping over, and an ejector for shoving bottles off the transfer disk onto the conveyor.

Referring to the accompanying drawings, which are made a part hereof and on which similar reference characters indicate similar parts, Figure 1 is a side elevation and Figure 2 a plan view of one type of this invention, Figure 3 being a sectional detail on the line 3—3 of Figure 1.

Figure 4 is a side elevation and Figure 5 a plan view of one type of this invention, Figure 6 being a section on the line 6—6 of Figure 4.

Referring now first to the type of the invention on Sheet 1, the numeral 1 designates broadly a framework supporting the mechanism between a feed trough F or the like from which articles such as bottles B are delivered, and a receptacle or carrier such as an endless belt C moving in the direction indicated by the arrows, which will be along a line substantially at right angles to the line occupied by such mechanism. The trough F consists of a bottom and side pieces and a cross-piece F′ spaced from the bottom to permit a bottle to pass between it and the bottom. The latter in Figures 1, 2, and 3 is an elevator made up of an endless belt or apron 2 trained around a lower roller 3, and its upper stretch leading thence with an incline to and over an upper roller 4, then horizontally over a table 5, and around a roller at the far edge of said table, whence its lower stretch 6 leads back beneath said table over another roller 7 and back to the roller 3. Supported by brackets 8 is a guide 9 fixedly mounted above the upper stretch of said apron. Opposite said guide is an endless chain 10 carrying a series of jaws 11 which are preferably curved plates as shown, the chain moving around upper and lower sprocket wheels 12 and 13 whose shafts are oblique to a vertical or perpendicular to the active stretch of the apron 12. The dished sides of the jaws are next to the guides 9, with which they coact so as to hold the articles B in slightly inclined or nearly upright position, their butts resting on the apron which moves upward in the direction shown by the arrows. Any suitable driving mechanism may be employed, such as a motor M herein shown as belted at 14 to a shaft 15 having a worm 16 engaging a worm gear 17 on the shaft of the roller 4, and the other end of this shaft may be geared as at 18 to the shaft of the sprocket wheel 12; but it will be understood that the driving mechanism is shown only for sake of illustration, and it is desirable that the apron 2 and chain 10 shall move at the same speed.

The transfer mechanism consists of a disk 30 standing in a horizontal plane and made of thin sheet metal closely overlying the upper stretch of the apron where the latter lies on the table 5; and as herein shown, this disk is driven by connections broadly indicated at 31 including a belt 32 leading to one of the shafts which is driven by the motor. What might be called the rear half of the disk extends beyond the apron entirely, and its edge at 33 stands close to the adjacent edge 34 of the conveyor C, and as the arrows indicate these edges are moving in the same direction. An ejector in the shape of a scraper 35 is fixedly mounted above the rear half of the disk, leading from a point about at its axis, across its edge, and lapping over onto the conveyor a little as at 36. Two rotary guards in the shape of wheels 37 and 38 are mounted on upright shafts and overhang the disk, as shown, their purpose being to prevent the bottles slipping off the disk as they travel around upon it along the path indicated by the dotted line. In this embodiment of the invention the cross piece F′ serves to hold the side pieces in spaced relation, and also to prevent a bottle from assuming an improper position on the conveyor, since bottles can only fall lengthwise through the hole in a manner to stand on the conveyor where they are supported in spaced relation by the jaws 11.

In the type of invention shown in Figures 4, 5, and 6, an elevator apron 42 is trained around a lower roller 43 and a single larger upper roller or drum 44, two parallel spaced guards 49 carried by brackets 48 overlying the active stretch of this elevator apron, and instead of curved jaws carried on a separate chain, the jaws in this construction are pins 41 or the like, spaced and in pairs and moving upward between the guides.

The transfer disk 50 is mounted in the same relation to the carrier C, but much nearer to the elevator, its forward edge underlying the large roller 44 as seen at 51. The scraper 55 is carried by brackets 57 and 58, and its forward end is continued beyond a point 54 over the axis of the disk into a guard 53 for a purpose yet to appear. In this type of the invention there is provided a finger 52 upstanding from the framework and curving over the apron where the latter passes around the upper roller 44, the finger standing between the paths followed by the jaws or pins 41 so that the latter pass astride it as will be clear. The parts are here driven by an electric motor and connections which are shown for purposes of illustration and need hardly to be described.

In the operation of this mechanism in either of its types, articles such as bottles B are delivered at F and are picked up by the jaws at the lower end of the elevator, the bottles in both instances being carried upward on its active stretch in a position oblique to the vertical. As seen in Figure 1, the bottles stand nearly upright with their butts resting on the apron 2, but as seen in Figures 4 and 5, the bottles lie on their sides with their butts upward and forward and their necks engaged between the pins 41, the cross-piece F′ serving in this case to hold back the top of the bottle if necessary and cause it to fall into the position shown in Figure 4. In either case it is necessary that when the bottles are delivered from the elevator they assume an upright position so as to be handled properly by the transfer disk. In Figures 1 and 2 when a jaw 11 moves past the upper end of the guide 9 and commences to move away from it, its grasp on the bottle is released a little so that the bottle settles down and its butt falls on the horizontal stretch of the apron which is moving along the table 5 and under the thin disk 30, and hence the bottle in its upstanding position is conveyed onto the disk and by the latter to the conveyor. In Figures 4 and 5, when the pins move past the free end of the finger 52, the heavy end of the bottle rides over this finger as it is pushed upward; the bottle finally tilts so that its neck is disengaged from between the pins which have carried it upward, and it is up-ended and dropped directly onto the disk at about the point shown in dotted lines in Figure 5, the guard 53 serving to prevent it from toppling over. In either type of the invention, the transfer disk in its rotation carries the upstanding bottle around until the bottle strikes the scraper, and by the latter it is ejected or pushed off onto the carrier C, whence it is conveyed wherever desired.

Thus is effected the handling of articles which need to be carried from any point to a receptacle or conveyor as indicated at C herein. The former need not be a delivery trough as suggested, and the latter need not be a factory belt or conveyor, but if the articles are of the character of bottles, which it is desired to handle as herein described, means are necessary for upending them when they are delivered onto the transfer disk so that the latter may pass them in upright position to the receptacle or conveyor as is explained. Therefore the use of the word "bottle" herein must be taken with some reservations. The driving mechanism is wholly illustrative, and other unnecessary details may be left to the builder.

Having thus fully described my said invention, what I claim as new and desire to secure by Letters Patent, is:

1. In a mechanism for handling bottles, the combination with a movable apron and a conveyor adjacent thereto, of a rotary disk in close relation to the apron and in position to receive bottles from the apron, means overlying and terminating at the center of the disk and projecting over the conveyor in a position to intercept a bottle on the disk and to direct it onto the conveyor, a guard wheel overlying the disk and the conveyor and mounted to rotate on an axis parallel with the axis of the disk, and means for rotating the disk and for moving the apron in the direction to discharge thereto.

2. In a bottle conveying mechanism, a rotary conveyor disk, a second conveyor adjacent to one edge thereof, an ejector extending over adjacent edges of the two conveyors, and elevated guard wheels in the angles between said conveyors for guiding said bottles, substantially as set forth.

3. In a bottle conveying mechanism, a rotary conveyor disk, a conveyor belt having an edge adjacent to said disk, an ejector approximately radial of said disk extending over the adjacent edge of said belt, and guard wheels in the angles between said disk and belt cooperating with said ejector in guiding said bottles, substantially as set forth.

4. In a bottle handling mechanism, a belt, a disk for conveying bottles thereto, means to feed bottles to the disk, gearing for positively driving the disk, and guide wheels in the angles between the belt and disk to guide the bottles in their travel, substantially as set forth.

In witness whereof, I have hereunto set my hand and seal at Muncie, Indiana, this 8th day of September, A. D. nineteen hundred and twenty-three.

MERTON C. HEATH.